United States Patent
Petrowsky

(10) Patent No.: US 10,316,979 B2
(45) Date of Patent: Jun. 11, 2019

(54) CERAMIC RUPTURE DOME FOR PRESSURE CONTROL

(71) Applicant: ARMOR TOOLS INTERNATIONAL INC., Red Deer (CA)

(72) Inventor: Conrad Petrowsky, Red Deer (CA)

(73) Assignee: ARMOR TOOLS INTERNATIONAL INC., Calgary (CA)

( * ) Notice: Subject to any disclaimer, the term of this patent is extended or adjusted under 35 U.S.C. 154(b) by 0 days.

(21) Appl. No.: 14/482,973

(22) Filed: Sep. 10, 2014

(65) Prior Publication Data

US 2016/0069462 A1    Mar. 10, 2016

(51) Int. Cl.
*F16K 17/16*    (2006.01)

(52) U.S. Cl.
CPC ............ *F16K 17/162* (2013.01); *F16K 17/16* (2013.01)

(58) Field of Classification Search
CPC ... F16K 17/16; F16K 17/162; Y10T 137/1744
USPC ......... 137/68.11, 68.19, 68.26, 68.27, 68.28, 137/68.23, 68.25
See application file for complete search history.

(56) References Cited

U.S. PATENT DOCUMENTS

| | | | |
|---|---|---|---|
| 244,042 A | 7/1881 | Farrar | |
| 2,616,502 A | 11/1952 | Lenz | |
| 3,445,032 A * | 5/1969 | Hansen | F16K 17/162 137/68.25 |
| 3,484,817 A * | 12/1969 | Wood | F16K 17/16 220/89.2 |
| 3,779,263 A * | 12/1973 | Edwards | E21B 34/063 137/68.25 |
| 4,126,151 A * | 11/1978 | Bullerdiek | F16K 17/16 137/68.25 |
| 5,411,098 A | 5/1995 | Schmidt et al. | |
| 5,526,878 A | 6/1996 | Duell et al. | |
| 5,782,486 A * | 7/1998 | Barnes | B60N 2/002 137/68.13 |
| 5,924,696 A | 7/1999 | Frazier | |
| 5,979,477 A * | 11/1999 | Stillings | F16K 17/16 137/1 |
| 6,834,722 B2 | 12/2004 | Vacik et al. | |

(Continued)

FOREIGN PATENT DOCUMENTS

| | | |
|---|---|---|
| AU | 628541 B2 | 9/1992 |
| CA | 2228728 A1 | 8/1998 |

(Continued)

*Primary Examiner* — P. Macade Nichols
(74) *Attorney, Agent, or Firm* — Bennett Jones LLP

(57) ABSTRACT

A one-time-use pressure-actuated conduit closure is provided, to selectively withstand fluid pressure from one side of the device until the closure is removed remotely, the closure device being a frangible dome designed to withstand fluid pressures from one side but to rupture upon application of higher pressure on its other side, which provides a mechanism to isolate downhole fluid under (high) pressures in part of a well during operations for a period of time selected by an operator, and then to remove the isolation by breaking the rupture dome remotely by application of extra fluid pressure or other forces from surface. The frangible dome has features in at least one surface to guide and control its breakage to provide controlled shard sizes and shapes and a predictable opening for minimal obstruction of the conduit when broken away.

11 Claims, 4 Drawing Sheets

(56) References Cited

U.S. PATENT DOCUMENTS

| | | |
|---|---|---|
| 7,806,189 B2 | 10/2010 | Frazier |
| 9,593,542 B2 * | 3/2017 | Getzlaf et al. .......... E21B 17/08 137/68.25 |
| 2006/0124315 A1 | 6/2006 | Frazier et al. |
| 2013/0126152 A1 | 5/2013 | Banks et al. |
| 2014/0083716 A1 | 3/2014 | Frazier |

FOREIGN PATENT DOCUMENTS

| | | |
|---|---|---|
| CA | 2819681 A1 | 8/2014 |
| EP | 1923535 A1 | 5/2008 |
| RU | 2218539 C1 | 12/2003 |
| RU | 2492318 C2 | 9/2013 |
| WO | 2010068329 A1 | 6/2010 |
| WO | 2011041456 A1 | 4/2011 |

\* cited by examiner

DETAIL C
SCALE 5 : 1

SECTION A-A

CERAMIC RUPTURE DOME FOR PRESSURE CONTROL

FIELD OF INVENTION

The present invention relates generally to a one-time-use pressure-actuated valve or closure to selectively withstand fluid pressure from one side of the device until the closure is removed remotely. This is done by configuring the device as a frangible dome which can withstand high pressures from one side but will rupture in the presence of high pressure on its other side. The rupture dome provides a mechanism to isolate downhole fluid under high pressures during initial operations in a drillstring in a well for a period of time selectable by the driller or operator, and then to remove the isolation by breaking the rupture dome remotely by application of extra fluid pressure or other forces from surface.

These operations are useful in directional, horizontal or deviated wells during snubbing, bridge-plug retrieval or zone separation operation in combination with packers and/or completion strings. The dome of this device provides pressure isolation for vertical as well as non-vertical operations which can be opened without wireline, and can be used in conjunction with other equipment such as subassemblies which include landings for retrieval, or other functions.

BACKGROUND OF THE INVENTION

In drilling, completion or service operations in a deviated well, it is sometimes important to be able to seal the tubing string to isolate production or other pressurized zones of the wellbore.

In the past, tubing end-plugs have been used during injection of tubing into such a well, the plugs generally being a metallic or aluminum disc attached to the bottom of the tubing string prior to injection, and then the removal of the metallic disc from the tubing string at or near bottom hole. An example is found in U.S. Pat. No. 244,042 Farrar (1881). This has the undesirable effect of leaving the metal at the bottom workface of the wellbore which is difficult or expensive to remove and can interfere with further drilling or other operations. These devices have only been run at the bottom of a tubing string.

Another mechanism sometimes seen is the use of an Otis® nipple, consisting of multiple profiles to receive a variety of plug devices via wireline delivery downhole. These mechanisms provide for a single plug, and while unpluggable and repluggable, are constrained by the plug delivery mechanism—that is, wireline plugs may be difficult to retrieve from deep deviated or horizontal wellbores, and may be impossible to inject and refit in non-vertical orientations. Additionally, if such a plug fitting fails during operations, the wireline plug may become a projectile, and two wireline plugs cannot or cannot easily be installed during or for operations. Similarly, multi-profile landing nipples to receive a variety of plugs are manufactured under the Baker® trade name.

Rupture domes have been used in similar situations downhole. For instance, a system providing a "Frangible Pressure Seal" is disclosed in Canadian Patent Application 2,228,728 by Frazier (CA'728). In that case ceramic shells with a circular seating face and a radial curvature are provided as a breakable seal for inclusion in a downhole subassembly. In CA'728, the ceramic disc is formed with a precise arcuate shape (in cross-section) to offer maximum pressure resistance. CA'728 is designed to provide a strong barrier to fluid pressures, yet be capable of being broken by wielding a breaking implement downhole (such as by dropping a bar down the tubing). This design would be unsuitable, for instance, in a deviated or non-vertical well-bore's tubing string because the bar or breaking implement could not be propelled by gravity alone should the non-vertical portion of the wellbore be a very great distance, or should the curvature of the deviated bore impair the breaking tool's travel velocity (or striking force). Additionally, where the domes of '728 are ruptured, the resulting passage may be irregular and restrict fluid flow in the tubing's bore past the remnants of the dome. As well, resulting fragments may be irregular or large which may interfere with fittings, drilling, or other well bore characteristics or operations.

SUMMARY OF THE INVENTION

To mitigate some of the problems of the prior art, the rupture dome of this invention is manufactured of a frangible material with a specific arcuate domed shape and with included features in at least one surface of the domed shape which guide and control fragmentation of the dome when it is broken so that the pieces of the ruptured dome are of a controlled size and shape designed to avoid plugging or hanging in the wellbore or any associated equipment. The frangible dome may be made of a material such as certain ceramics, glass, cast metal, dissolvables, or any suitable material, should not react negatively with or interact to cause damage to the well or associate equipment.

In an embodiment, a rupture dome for use as a breakable seal for a conduit formed by tubing formed of a breakable material, is provided, which includes:
  a. A circular-shaped body with dome-shaped cross-section with
     1. A convex side
     2. A concave side
     3. An attached circumferential rim for mounting to a seal on the inside of the tubing or a fitting on the tubing
  b. One side having features included in its surface to guide the breakage of the rupture dome
  c. The portion of the body defined between the convex side and concave side forming a breakaway section, being frangible, designed to hold high fluid pressure applied to the convex side, and to break when fluid pressure applied to the concave side exceeds a threshold
  d. The breakaway section when ruptured as a result of application of pressure to the concave side exceeds the threshold, designed to break into pre-determined fragments defined at least in part by the features included in its surface;
  e. The dome may also be ruptured using mechanical or other forces.

DETAILED DESCRIPTION

Figure 1:
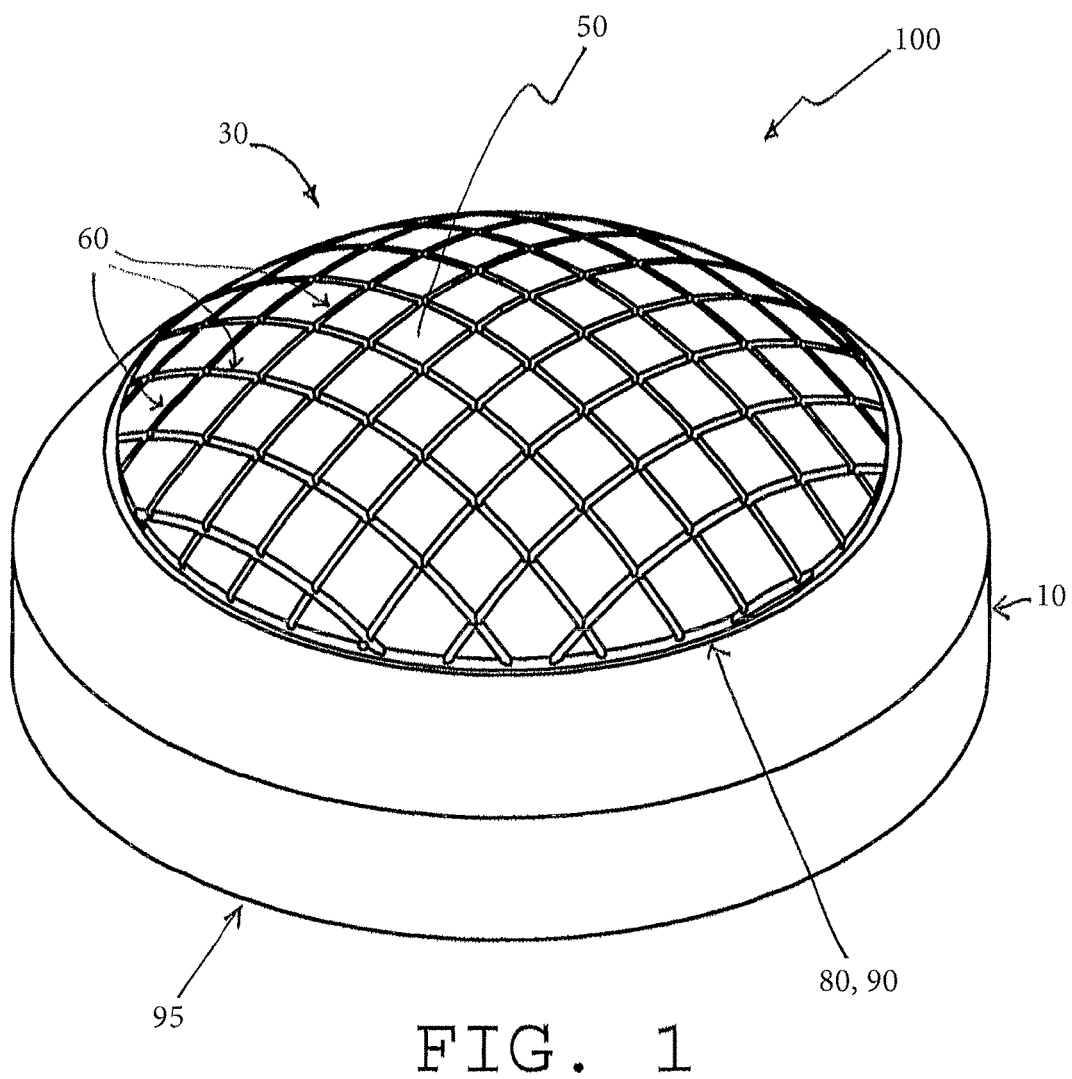
FIG. 1 is an illustrated elevation of a rupture dome from the top and side.
Figure 2:
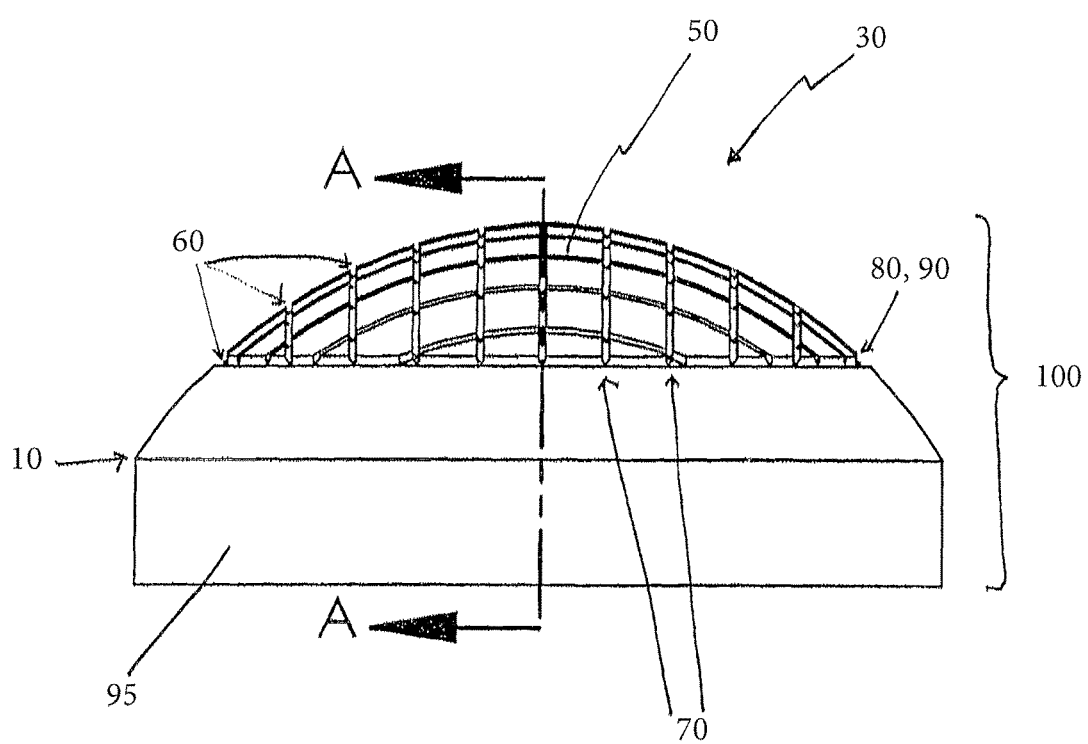
FIG. 2 is a side elevation of a rupture dome showing an embodiment of groove and lip structures
Figure 3A:
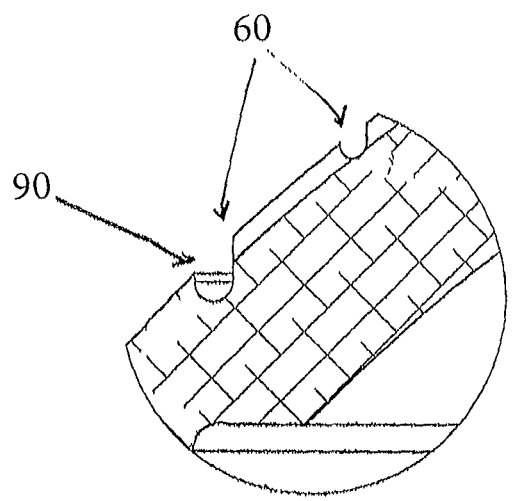
FIGS. 3 and 3a are a cross-section of the rupture dome of FIG. 2 along line A-A, with FIG. 3a providing an expanded detailed illustration of an embodiment of ball-end milled groove structures on the top surface of the rupture dome
Figure 3:
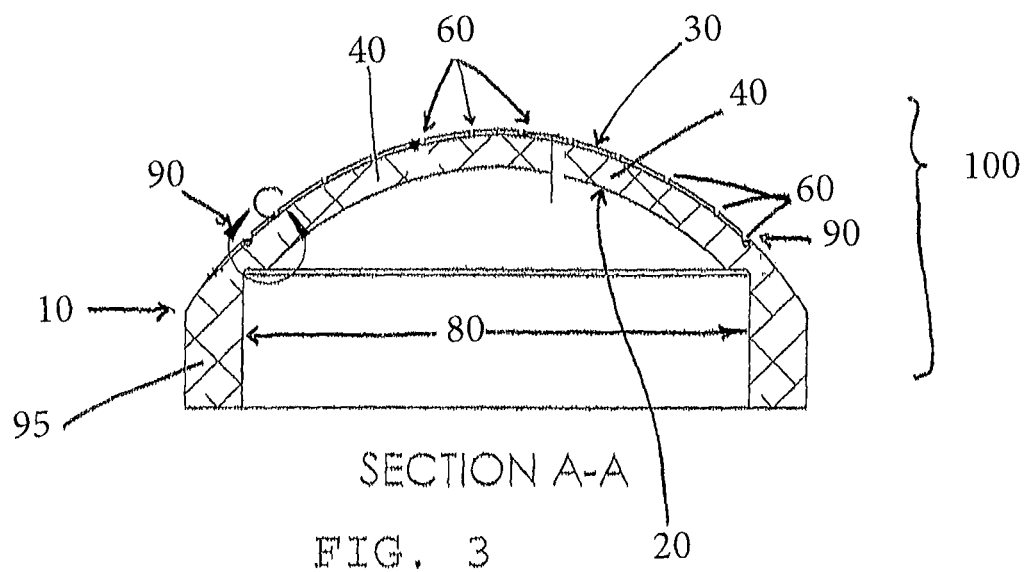
Figure 4:
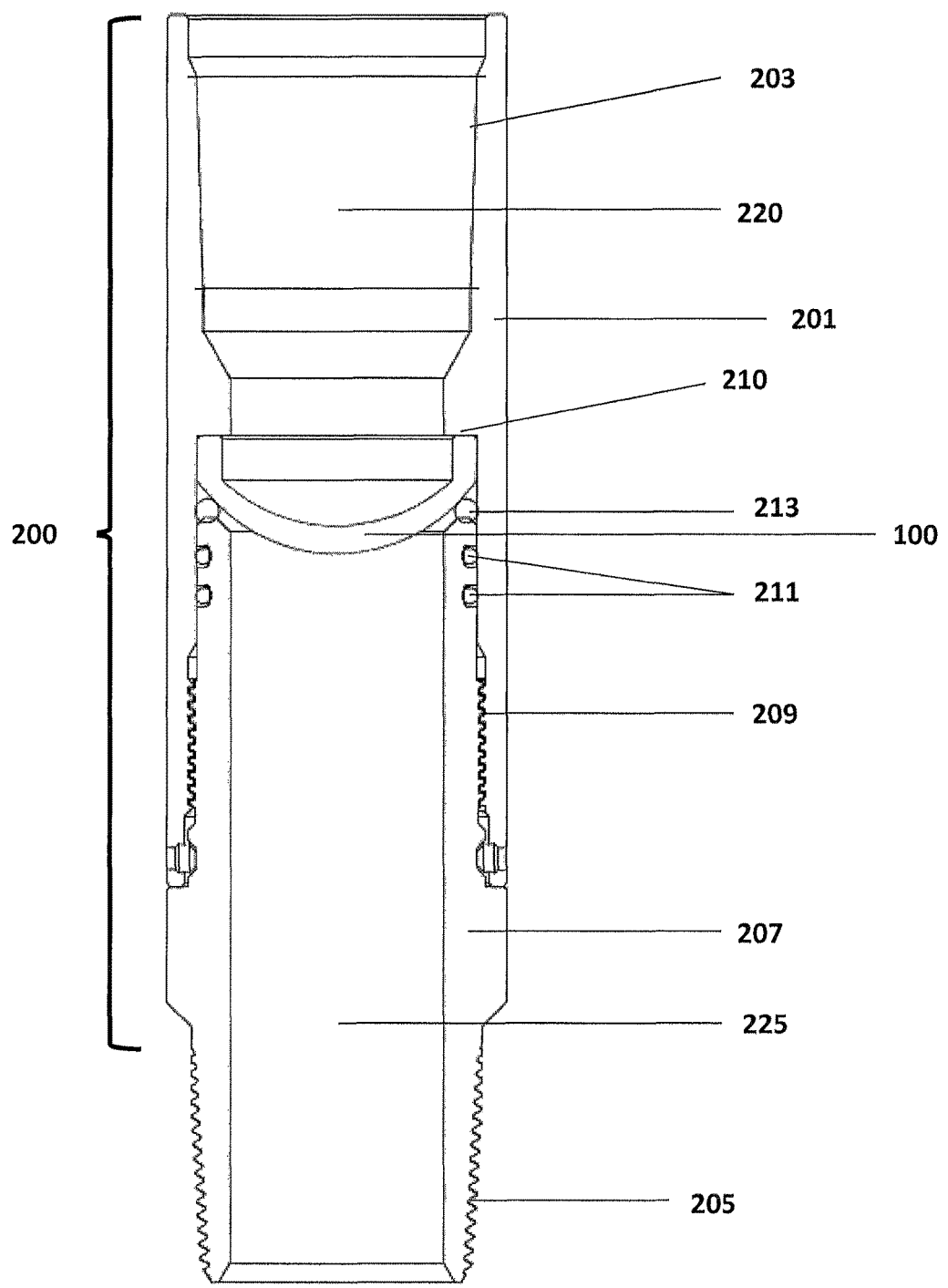
FIG. 4 is a partial cutaway drawing of a subassembly for mounting the pressure dome in a tubing string.

The present invention provides for a rupture dome 100 for use as a breakable seal in a subassembly (not shown). The rupture dome 100 is made with an outer circumference the edge of which 10 fits within the subassembly (not shown) and is sealed to the subassembly which then seals the internal passageway of a fluid conduit (not shown) such as a tubing string for use in a well. Generally, the field to which this invention is directed is the oil and gas industry, more particularly pressure control in operations with respect to oil or gas wells, and even more particularly, deviated or non-vertical wells.

The rupture dome 100 is made of a frangible material such as a ceramic. It has a domed shape, with a hollowed or concave side 20 and a convex side 30. The arc of the concave 20 and convex 30 sides are, in an embodiment, similar or equivalent, making the dome's curved body 40 of a relatively even thickness.

Depending upon the diameter of the rupture dome 100, the thickness and curvature of the dome's body 40 will differ, being designed to withhold a predetermined range of fluid pressure from one side (applied to the convex side 30) and to break or rupture at a different but predetermined pressure threshold from the other side (applied to the concave side 20). In this way, the seal provided by the rupture dome 100 in the subassembly sealed to the tubing can be maintained, isolating the sealed portion of the tubing from the rest of the well, until pressure above the designed rupture pressure is applied to the concave side 20 of the rupture dome 100.

In a preferred embodiment, the rupture dome is designed to withstand 10,000 psi from the high pressure bearing convex side 30 without breaking, but to breakaway or rupture when the pressure at the other (concave) side 20 exceeds the pressure on the other (convex) side 30 by 10-15% of the maximum pressure the dome's convex side can withstand. In one embodiment, the pressure dome can withstand a pressure differential where pressure on the convex side is the same as or up to 10,000 psi greater than the pressure on the concave side before rupturing, but the pressure dome is designed so that it can withstand a pressure differential where the pressure on the concave side is 1500 psi greater than the pressure on the convex side but will rupture if that pressure differential exceeds 1500 psi (these numbers are by example, and are an approximation of a preferred embodiment). This means that if the pressure dome was in an environment sealing a well bore with pressure from formation of 9,000 psi, the dome could be ruptured by application of fluid pressure from surface equipment of 10,501 psi or greater (a pressure differential of over 1500 psi) under control of an operator. Similarly, if tested at a pressure on the convex side of 1,000 psi, the dome can be ruptured by applying 2,501 psi or greater to the concave side (a differential of greater than 1500 psi). These examples are to show how the rupture pressure differential should be designed such that there is a small (something like 10-25% of the maximum pressure the convex side will withstand) but significant (so that there is a reduced chance of accidental rupture) pressure differential which can be applied to the concave side of the dome to cause it to rupture in a controllable (by manipulation of fluid pressure applied to the concave side) manner. In this way, the rupture dome may be purposefully ruptured by selective application of pressure from surface to the concave side 20 to cause the dome to fail, rupture, and break the seal it previously formed. To provide this performance characteristic set, a ceramic rupture dome 100 with a 2⅜" O.D. will have a dome wall 40 thickness of approximately 0.2575" into which the grooves extend by 0.075" and feature lines 70, 90 formed or cut into the dome wall 40, if milled for example, by a 0.030" ball-end mill to a depth of about 0.075".

To ensure that the rupture dome, when ruptured, does not break into large, irregular and harmful fragments of dome material, which could hang in, plug or damage downhole equipment or tubing, a specific pattern may be included in a surface of the rupture dome 100—in a preferred embodiment, the pattern may be included in the outer surface of the convex side 30. The patterns 50 can be a symmetrical grid of features 60 in the outer surface of the convex side 30, or can be any suitable pattern, and can be included during the molding or forming stage of manufacture or machined or carved or otherwise made. In an embodiment, the features may be milled using a 0.030" ball-end mill with 0.015" radius, or a 0.020 ball-end mill with 0.010" radius in a squared grid pattern with feature lines 70 spaced approximately 3/16 inches apart.

The feature pattern 50 of lines 70 in the surface of the convex side 30 of the rupture dome 100 are, in a preferred embodiment, within a radius 80 which is also a feature line 90 in the same surface 30, which radius 80 is about or slightly smaller than the interior diameter of the subassembly (not shown). In a preferred embodiment, for use in a 2⅜" O.D. tubing string seal with 2" I.D., this radius 80 will be approximately 2". This permits the rupture dome to break away when ruptured to leave a clean passageway bounded by the radius 80 feature line 90 once the broken parts of the rupture dome break and are removed from the seal, leaving an essentially unimpaired passage.

The rupture dome 100 can have an outer circumferential wall 95 for attachment to the subassembly 200.

The rupture dome 100 is attached to the tubing and its conduit or passageway 220, 225 by a subassembly 200 and the subassembly's conventional box and pin end threaded connectors (203, 205 respectively). The rupture dome 100 is set with a bottom side of its outer wall 95 on a shoulder 210 of a first part 201 of the subassembly 200, a seal such as an o-ring 213 may be placed on top of the rupture dome 100 between the rupture dome 100 and a second part 207 of the subassembly, said two subassembly parts being attached together by threaded means 209 and sealed by another o-ring 211. When whole, the pressure dome 100 isolates the tubing string and subassembly's inner passageway into two zones 220, 225 divided at the dome 100.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A rupture dome adapted to be attached in-line in a conduit formed by a tubing string in a well, the rupture dome for use as a breakable seal formed of a breakable material, including:
   i. a circular-shaped monolithic body with a dome-shaped cross-section with
      a. A convex side;
      b. A concave side;

c. An attached circumferential rim for mounting to a seal on an inside of the tubing string or a fitting on the tubing string;

ii. one side of a domed surface of the body having features included in the domed surface to guide breakage of the rupture dome;

iii. a portion of the body defined between the convex side and concave side forming a breakaway section, being frangible, built to hold high fluid pressure applied to the convex side, and to break when fluid pressure applied from equipment near the well's head at a surface to the concave side exceeds a threshold;

iv. the breakaway section configured to rupture as a direct result of application of pressure directly to the concave side which exceeds the threshold, and configured to break into pre-determined fragments defined at least in part by the features included in the surface of the dome.

2. The rupture dome of claim 1 where the rupture dome is made of ceramic.

3. The rupture dome of claim 1 wherein the features include at least one of:

i. a circular feature of substantially the same diameter as the tubing string's inner diameter;

ii. a series of symmetrical grooves in a pattern to define sizes of fragments into which the rupture dome will break when ruptured;

iii. a pattern of grooves or inclusions or ridges in a surface of the dome to encourage the dome to rupture in specific places to form pre-determined debris fragments.

4. The rupture dome of claim 1 with the rim formed to mate with a fixture in the tubing string so that the dome may be fitted and sealed, ruptured, then removed and replaced, so that the breakable seal provided by the rupture dome may be easily repeated.

5. The rupture dome of claim 1 wherein the dome is made to hold high fluid pressure applied to the convex side.

6. The rupture dome of claim 5 where the high fluid pressure sustained is approximately 10,000 psi.

7. The rupture dome of claim 1 wherein the dome is made to rupture when fluid pressure applied to the concave side exceeds the fluid pressure on the convex side by a pressure differential.

8. The rupture dome of claim 7 where the pressure differential is 10-25% of a maximum pressure sustainable by the convex side.

9. The rupture dome of claim 1 sized in diameter suitable for use in 2⅜" I.D. tubing.

10. The rupture dome of claim 1 sized in diameter for use in 2⅞" I.D. tubing.

11. The rupture dome of claim 3 where the symmetrical grooves are formed in a cross-hatched pattern.

* * * * *